United States Patent
Tajiri et al.

(10) Patent No.: US 7,023,805 B2
(45) Date of Patent: Apr. 4, 2006

(54) COMMUNICATION CONNECTING DEVICE CAPABLE OF RELIABLY TRANSMITTING DATA TO AN IP NETWORK AND A DATA TRANSMISSION CONTROL METHOD

(75) Inventors: Katsutoshi Tajiri, Tokyo (JP); Takashi Noda, Tokyo (JP); Rika Kamimura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 851 days.

(21) Appl. No.: 09/939,730

(22) Filed: Aug. 28, 2001

(65) Prior Publication Data
US 2002/0027913 A1    Mar. 7, 2002

(30) Foreign Application Priority Data
Aug. 31, 2000    (JP)    ............................. 2000-262744

(51) Int. Cl.
G08C 15/00    (2006.01)
(52) U.S. Cl. ....................... 370/236; 370/522; 358/1.15
(58) Field of Classification Search ........ 370/252–256, 370/401, 466, 474, 236, 522; 379/100.12, 379/100.17; 358/1.15
See application file for complete search history.

(56) References Cited

U.S. PATENT DOCUMENTS

| | | | |
|---|---|---|---|
| 5,546,388 A * | 8/1996 | Lin | 370/389 |
| 5,790,641 A * | 8/1998 | Chan et al. | 379/100.17 |
| 6,310,897 B1 * | 10/2001 | Watanabe et al. | 370/522 |
| 6,438,105 B1 * | 8/2002 | Qarni et al. | 370/231 |
| 6,449,255 B1 * | 9/2002 | Waclawsky | 370/236 |
| 6,483,600 B1 * | 11/2002 | Schuster et al. | 358/1.15 |
| 6,813,249 B1 * | 11/2004 | Lauffenburger et al. | 370/253 |
| 2002/0077005 A1 * | 6/2002 | Tajiri et al. | 439/894 |

FOREIGN PATENT DOCUMENTS

EP    0 880 271 A2    11/1998

OTHER PUBLICATIONS

Robert G. Tebbs, "Real-Time IP Facsimile: Protocol and Gateway Requirements", Bell Labs Technical Journal, vol. 4, No. 2, Apr. 1999, pp. 128-145.

(Continued)

*Primary Examiner*—Ricky Ngo
*Assistant Examiner*—Nguyen H. Ngo
(74) *Attorney, Agent, or Firm*—Venable LLP; Michael A. Sartori; Kavita B. Lepping (57) ABSTRACT

A communication connecting device includes a terminal unit controller for temporarily storing data received from a sending terminal unit. A packetizer/depacketizer collectively codes the data sequentially read out in accordance with size information fed from a size information storage. The packetizer/depacketizer determines whether or not the current data is the last one of a continues sequence of data and delivers, if the answer of the decision is positive, a detection signal to a frequency-of-transmission monitor. A UDPTL controller feeds additional data read out of the buffer to the frequency-of-transmission monitor in accordance with ITU-T Recommendation T.38. In response to the detection signal, the monitor outputs a control signal such that the coded data not sent a preselected number of times are repeatedly read out of the buffer and retransmitted the preselected number of times.

5 Claims, 8 Drawing Sheets

OTHER PUBLICATIONS

"Procedures for Real Time Group 3 Facsimile Communication Over IP Networks" ITU-T, T.38, International Telecommunication Union., Series T: Terminals for Telematic Services, Jun. 1998.

* cited by examiner

| IFP PACKET | | UDPTL PACKET | | |
|---|---|---|---|---|
| No. | MEANING | PRIMARY | SECONDARY 1 | SECONDARY 2 |
| 01 | CED | 01 | × | × |
| 02 | FLAGS | 02 | 01 | × |
| 03 | CSI | 03 | 02 | 01 |
| 04 | CSI/FCS | 04 | 03 | 02 |
| 05 | DIS | 05 | 04 | 03 |
| 06 | DIS/FCS | 06 | 05 | 04 |
| | | (06) | (05) | |
| | | (06) | | |
| 07 | FLAGS | 07 | × | × |
| 08 | TSI/FCS | 08 | 07 | × |
| 09 | DCS/FCS | 09 | 08 | 07 |
| 10 | TRAINING | 10 | 09 | 08 |
| | | (10) | (09) | |
| | | (10) | | |
| 11 | FLAGS | 11 | 06 | 05 |
| 12 | CFR | 12 | 11 | 06 |
| 13 | CFR/FCS | 13 | 12 | 11 |
| | | (13) | (12) | |
| | | (13) | | |

Fig. 4B

| IFP PACKET | | UDPTL PACKET | | |
|---|---|---|---|---|
| No. | MEANING | PRIMARY | SECONDARY 1 | SECONDARY 2 |
| 14 | SPEED | 14 | 10 | 09 |
| 15 | IMAGE DATA 0 | 15 | 14 | 10 |
| 16 | IMAGE DATA 1 | 16 | 15 | 14 |
| 17 | IMAGE DATA 2 | 17 | 16 | 15 |
| 18 | IMAGE DATA 3 | 18 | 17 | 16 |
| – | IMAGE DATA | – | – | – |
| 78 | IMAGE DATA 63 | 78 | 77 | 76 |
| 79 | IMAGE DATA 64 | 79 | 78 | 77 |
| 80 | IMAGE DATA 65 | 80 | 79 | 78 |
| 81 | SIG-END | 81 | 80 | 79 |
| 82 | FLAGS | 82 | 81 | 80 |
| 83 | EOP/FCS | 83 | 82 | 81 |
| | | (83) | (82) | |
| | | (83) | | |
| 84 | FLAGS | 84 | 13(X) | 12(X) |
| 85 | MCF | 85 | 84 | 13(X) |
| 86 | MCF/FCS | 86 | 85 | 84 |
| | | (86) | (85) | |
| | | (86) | | |

Fig. 5B

COMMUNICATION CONNECTING DEVICE CAPABLE OF RELIABLY TRANSMITTING DATA TO AN IP NETWORK AND A DATA TRANSMISSION CONTROL METHOD

BACKGROUND OF THE INVENTION

1. Field of the Invention

The present invention relates to a communication connecting device and a data output control method advantageously applicable to, e.g., a gateway that connects a G3 (Group 3) facsimile apparatus to an IP (Internet Protocol) network. More particularly, the present invention relates to a communication connecting device and a data output control method feasible for a real-time facsimile apparatus or terminal for sending UDP (User Datagram Protocol)/IP packets while monitoring the data of the packets.

Generally, for real-time facsimile communication over an IP network, a system configuration proposed by ITU-T (International Telecommunication Union-Telecommunication standardization sector) Recommendation T.38 is used. In this system configuration, an Internet facsimile apparatus or gateway is connected to the IP network at each of the transmitter and receiver sides. The Internet facsimile apparatuses each are connected to a particular G3 facsimile apparatus by a PSTN (Public Switched Telephone Network).

The Internet facsimile apparatus at the transmitter side temporarily stores data input from the sending G3 facsimile apparatus. The facsimile apparatus then packetizes the data by referencing packet size information fed thereto. The resulting packets are referred to as IFP (Internet Facsimile Protocol) packets.

UDP is applied to communication between the Internet facsimile apparatuses. For example, a UDP header is added to the head of a UDP payload storing data. Even when UDP packet data is lost, UDP does not execute processing for reconstructing the packet data.

Specifically, the Internet facsimile apparatus at the transmitter side temporarily stores the IFP packets to be sent. The Internet facsimile apparatus then writes every new IFP packet in the primary field of its storage area to thereby generate a UDPTL (facsimile UDP Transport Layer protocol) payload and send the UDPTL payload to the IP network. In addition, to prepare for the loss of the UDP packet data, the Internet facsimile apparatus writes the UDP packets sent in the past in the secondary field of the storage area to thereby form a UDPTL payload although the past UDP packets are redundant. Sequence numbers unique to the primary field are attached to the primary field. A UDPTL header is added to the head of the UDPTL payload to complete a UDPTL packet. The UDP payload is constituted by such a UDPTL packet. A UDP packet is made up of a UDP header and a UDP payload.

After an IP header has been added to the UDP packet, the UDP packet is sent to the IP network via a LAN (Local Area Network).

The Internet facsimile apparatus at the receiver side decomposes the received IP packets to the level of UDPTL packets. The Internet facsimile apparatus then classifies, among the IFP packets of the decomposed UDPTL packets, IFP packets to be used and then depacketizes the classified IFP packets by decoding them, thereby recovering the original data. The Internet facsimile apparatus temporarily stores the recovered data and then sends them to the receiving G3 facsimile apparatus.

The Internet facsimile apparatus sends a sequence of IFP packets in the form of consecutive UDPTL packets in accordance with the Recommendation T.38 protocol. At this instant, the IFP packets are repeatedly sent the same number of times up to, among a continuous sequence of data, data produced by subtracting the preselected number of storing regions of the secondary field of a UDPTL packet from the last IFP packet. However, consecutive data following the above data are sent a smaller number of times. Consequently, not all of the IFP packets are sent with constant reliability.

More specifically, in the event of continuous transmission based on the UDPTL protocol, IFP packets fed are again sent in the secondary field of the next UDPTL packet. However, if the next IFP packet is absent, then the UDPTL packet is not again sent. This brings about a difference in the frequency of transmission.

SUMMARY OF THE INVENTION

It is an object of the present invention to provide a communication connecting device and a data output control method capable of sending the entire sequence of data with constant reliability.

In accordance with the present invention, a communication connecting device is connected at one end to a first terminal unit and connected at the other end to a second terminal unit via an IP network. The device is selectively operable with a plurality of communication standards adaptive to the first terminal unit, second terminal unit and IP network for thereby implementing real-time communication. The device includes a terminal unit control circuit for storing data received from the first terminal unit or the second terminal unit, and controlling the first terminal unit in accordance with a first communication standard. A first storage stores size information representative of the size of data to be coded. A coding/decoding circuit collectively codes the data in accordance with the size information read out of the first storage and the first communication standard and determines whether or not the data is the last one of a sequence of continuous coded data. Further, the coding/decoding circuit decodes coded data received from the second terminal unit in accordance with the first communication standard. Assuming the loss of the coded data output from the coding/decoding circuit, a second storage stores the coded data. An information adding/separating circuit adds a header and data, which makes up for the loss of the coded data assumed, to the coded data in accordance with a second communication standard relating to the IP network. Further, the information adding/separating circuit separates coded data from data received from the second terminal unit and feeds the separated coded data to the coding/decoding circuit. In response to a detection signal output from the coding/decoding circuit to show that the coded data to be newly fed is the last coded data, a frequency-of-transmission monitoring circuit determines subject coded data transmitted an actual number of times, which is the sum of the transmission of the newly input coded data and the number of times of past transmission effected on the assumption of the loss, different from a preselected reference number of times of transmission. The monitoring circuit then generates a control signal for causing the subject coded data to be repeatedly transmitted by a difference between the actual number of times and the reference number of times. Subsequently, the monitoring circuit causes the subject coded data to be read out of the second storage in accordance with the control signal. An interfacing circuit converts the coded data input via the frequency-of-transmission monitoring circuit to a signal based on a command or converts a signal received from the second terminal unit to the coded data.

Further, in accordance with the present invention, a data output control method for a communication connecting device of the type described begins with a step of storing data received from the first terminal unit or the second terminal unit. Size information representative of the size of data to be coded is output. The data are collectively coded in accordance with the read out size information and a first communication standard. Subsequently, whether or not the coded data is the last one of a sequence of continuous (coded data is determined. The coded data is stored on the assumption of the loss of the coded data. In accordance with a second communication standard relating to the IP network, a header for the coded data and the coded data stored on the assumption of the loss are read out and combined. In response to a detection signal showing that the coded data to be newly fed is the last coded data, subject coded data transmitted an actual number of times, which is the sum of a transmission of the newly input coded data and the number of times of past transmission effected on the assumption of the loss, different from a preselected reference number of times of transmission are determined. A control signal is then generated for causing the subject coded data to be repeatedly transmitted by a difference between the actual number of times and the reference number of times,. The subject coded data are to be read out in accordance with the control signal. Finally, the coded data are converted to a signal based on a command and then output.

BRIEF DESCRIPTION OF THE DRAWINGS

The objects and features of the present invention will become more apparent from consideration of the following detailed description taken in conjunction with the accompanying drawings in which:

FIG. 5 shows how FIGS. 5A and 5B are combined;

FIGS. 5A and 5B demonstrate a specific conventional Internet facsimile communication sequence to be executed by the system of FIG. 3.

DESCRIPTION OF THE PREFERRED EMBODIMENT

Figure 1:
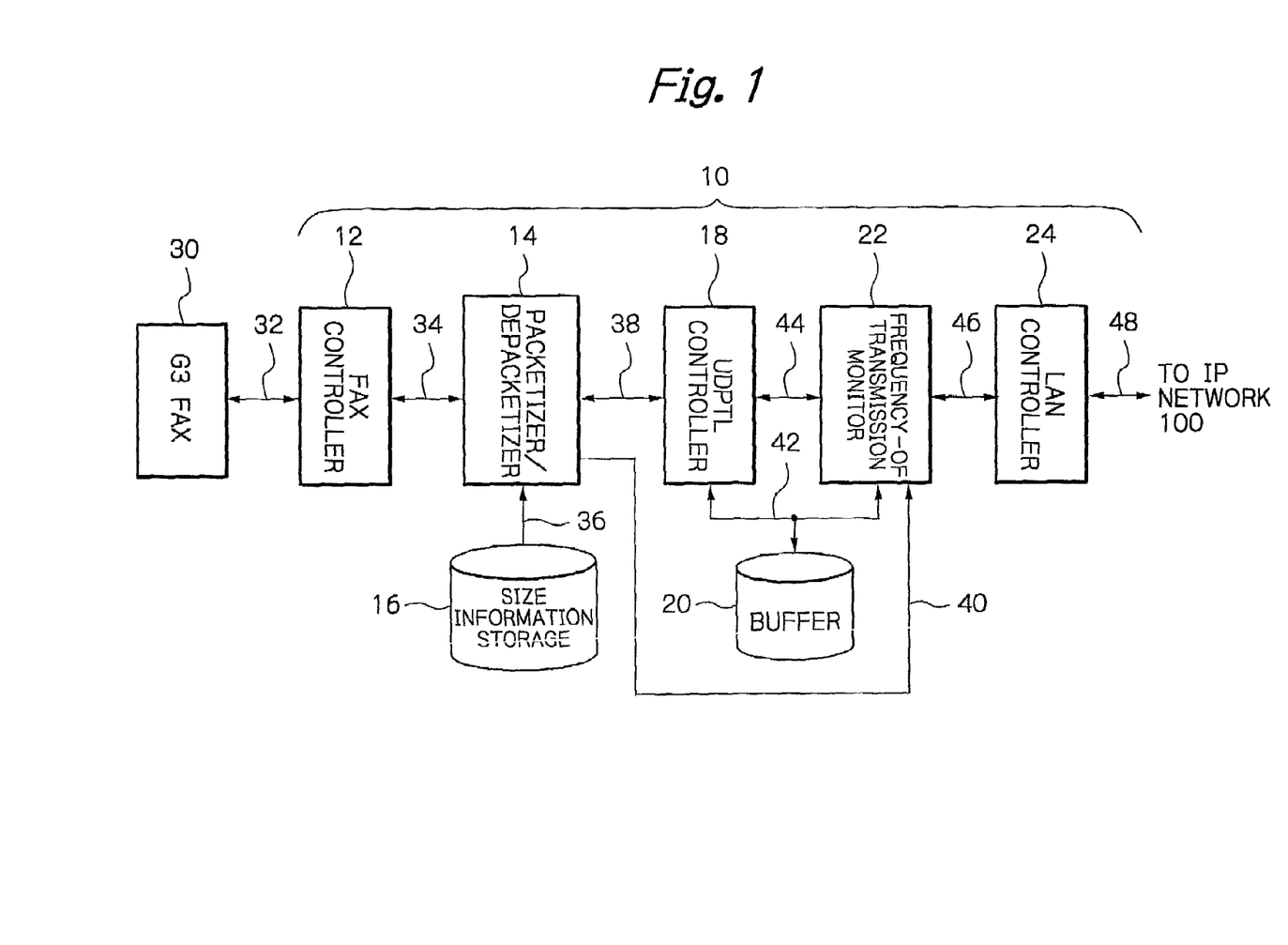
FIG. 1 is a schematic block diagram showing a preferred embodiment of the communication connecting device in accordance with the present invention and implemented as an Internet facsimile apparatus by way of example.

Referring to FIG. 1 of the drawings, an Internet facsimile apparatus or terminal (Internet FAX hereinafter) 10 to which a communication connecting device embodying the present invention is applied will be described. Part of the Internet FAX 10 not relevant to the understanding of the present invention is neither shown nor will be described specifically.

Signals are designated by reference numerals attached to signal lines on which they appear.

As shown in FIG. 1, the Internet FAX 10 includes a FAX controller 12, a packetizer/depacketizer 14, a size information storage 16, a UDPTL controller 18, a buffer 20, a frequency-of-transmission monitor 22, and a LAN controller 24. An analog G3 facsimile apparatus (G3 FAX hereinafter) 30 is connected to the Internet FAX 10 and operates in accordance with Recommendation T.30 (revised in 1996).

The FAX controller 12 includes a non-destructive memory for storing data and has an interface function for converting signals meant for the G3 FAX 30, although not shown specifically. The non-destructive memory is capable of repeatedly outputting data 32 input from the G3 FAX 30. The FAX controller 12 selectively controls the write-in of the data 32 or the read-out of data 34 in accordance with a control signal fed from a system controller not shown. The data 34 read out of the memory are fed to the packetizer/depacketizer 14. When the Internet FAX 10 is a receiving terminal, the packetizer/depacketizer 14 depacketizes received data while the FAX controller 12 stores the resulting depaketized and decoded data 34.

The packetizer/depacketizer 14 includes a packetizing circuit and a depacketizing circuit although not shown specifically. The size information storage 16 stores information representative of the size of a single packet beforehand. The storage 16 feeds packet size information 36 to the packetizer/depacketizer 14. The packetizing circuit divides the input data 34 into packets each having the packet size indicated by the information 16. The packetizing circuit then delivers coded IFP packets 38 to the buffer 20 and UDPTL controller 22. The depacketizing circuit decodes and depacketizes coded IFP packets 38 input from the UDPTL controller 18.

The packetizer/depacketizer 14 additionally includes a decision circuit, not shown, for determining whether or not the current data is the last one of a continuous sequence of data 34 to be sent at a time. If the answer of this decision is positive, the decision circuit delivers a detection signal 40 to the frequency-of-transmission monitor 22.

The UDPTL controller 18 produces a UDPTL payload including the IFP packet data 38 in accordance with Recommendation T.38. The UDPTL payload consists of a primary field corresponding to a packet number and a secondary field storing an IFP packet or packets having been sent. More specifically, the past data stored in the buffer 20 are fed to the secondary field although redundant. If desired, an error correction code may be fed to the secondary field in addition to the past data. The IP packet data 38 are delivered also to the buffer 20 via the UDPTL controller 18 and a signal line 42.

The UDPTL controller 18 adds a UDPTL header to the head of the UDPTL payload to thereby complete a UDPTL packet, which is a UDP payload. The UDPTL controller 18 delivers the UDPTL packet 44 to the frequency-of-transmission monitor 22.

In the event of receipt, a received UDPTL packet 44 having the above-described layered data structure is input to the UDPTL controller 18. The UDPTL controller 18 divides the received UDPTL packet 44 into IFP packets and then feeds necessary IFP packet data 38 to the packetizer/depacketizer 14.

Figure 2:
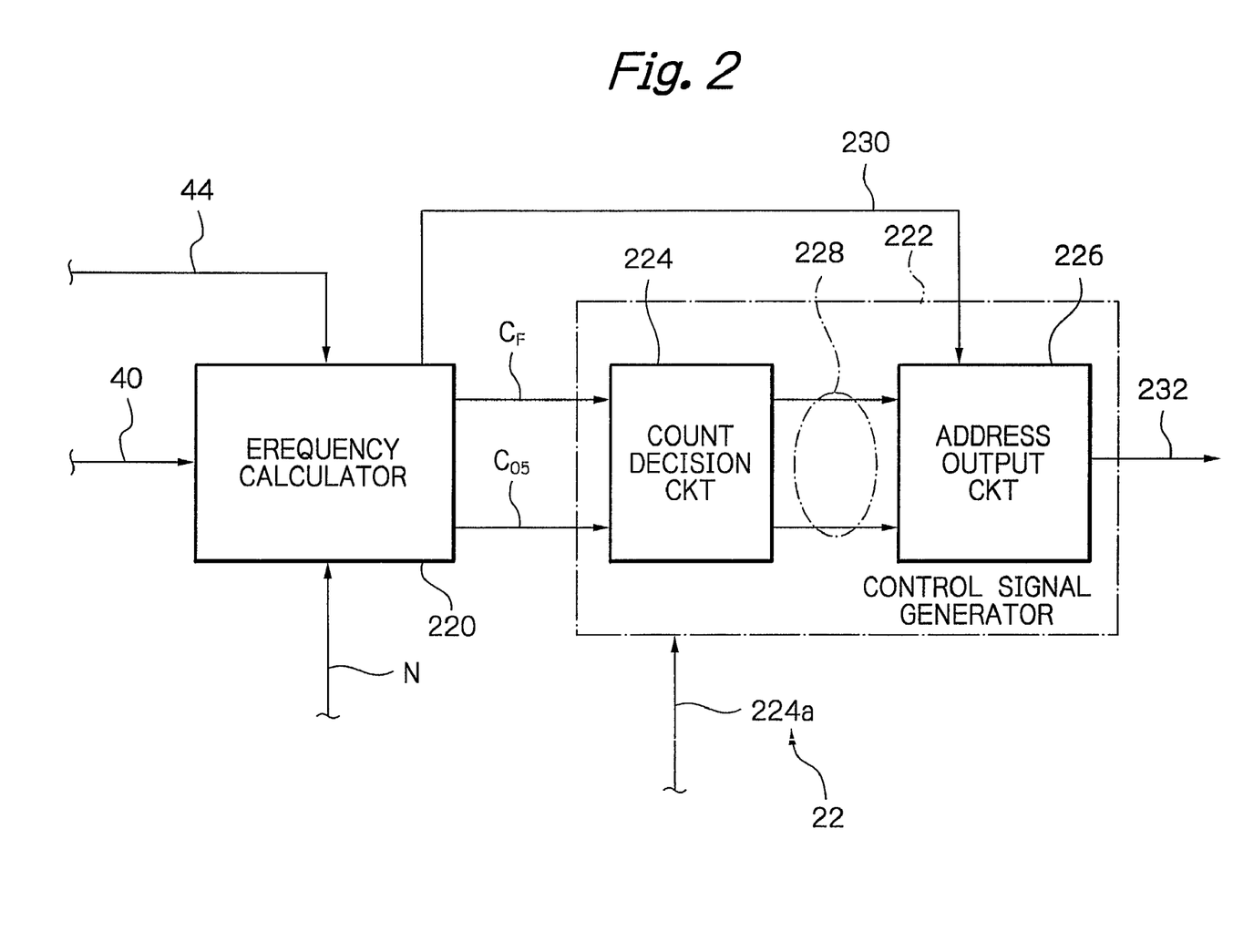
FIG. 2 is a schematic block diagram showing a specific configuration of a frequency-of-transmission monitor included in the illustrative embodiment.

As shown in FIG. 2 specifically, the frequency-of-transmission monitor 22 includes a frequency calculator 220 and a control signal generator 222. The monitor 22 transfers every UDPTL packet 44 fed from the UDPTL controller 18 to the LAN controller 24 as a UDPTL packet 46.

The frequency calculator 220 executes additional processing after the transmission of UDPTL packets only when it receives the detection signal 40 from the packetizer/depacketizer 14. Specifically, assume the oldest serial number to the newest serial number contained in a continuous sequence of UDPTL packets 44. Then, the frequency calculator 220 handles, among IFP packets contained in the sequence of UDPTL packets 44, IFP packets whose frequencies of transmission are short as subject data.

More specifically, the calculator 220 handles data with the second oldest serial number stored in the secondary fields of UDPTL packets 44 to data with the newest serial number $N_F$ fed to a primary field as subject data. Assume that the serial number attached to the first subject data is $N_{ta}$, and that the secondary field has n storing regions. Then, each serial number is sent N consecutive times, which is the sum of a single primary field and the storing regions of a secondary field n−1 (N=n+1). That is, the serial numbers $N_{ta}$ to $N_F$ each are repeatedly sent one time to N consecutive times. If desired, such subject data may be set by a signal input from the outside of the frequency-of-transmission monitor 22 for allowing the number of times N to be set with some freedom.

The frequency calculator 220 determines the serial number $N_{ta}$ of the first subject data by using an equation:

$$N_{ta}=N_F-(n-1) \qquad \text{Eq. (1)}$$

The frequency of retransmission of the serial number $N_{ta}$ is selected to be one time. The IFP packet with the serial number $N_F$ is sent (N−1) consecutive times, i.e., n times. It will therefore be seen that the IFP packets with the serial numbers $N_{ta}$ to $N_F$ each should be sent one time to n consecutive times.

In the illustrative embodiment, the number of storing regions n of a secondary field is 2 while the frequency N of retransmission is 3. Therefore, when the serial number $N_F$ of the last data is 06, the serial number $N_{ta}$ of the subject data is 05. In this case, the data with the serial numbers 05 and 06 are the subject data. Because the last data with the serial number 06 has already been sent one time, a retransmission frequency $C_F$ is N−1=2. Likewise, because the data with the serial number 05 has already been sent two times, a retransmission frequency $C_{05}$ is N−2 =1. The frequency calculator 220 feeds the retransmission frequencies $C_F$ and $C_{05}$ to the control signal generator 222.

The control signal generator 222 includes a count decision circuit 224 and an address output circuit 226. The count decision circuit 224 includes counters, not shown, equal in number to the subject data, i.e., two counters in the illustrative embodiment. The retransmission frequencies $C_F$ and $C_{05}$ each are input to one of the two counters. At this time, the frequency-of-transmission monitor 22 may continuously deliver an output inhibition signal to the UDPTL controller 18 until the feed of a new continuous sequence of data, although not shown specifically. A clock 224a is input to the control signal generator 222. The counters of the count decision circuit 224 each decrement by 1 (one) at a time in accordance with the clock 224a in synchronism with the transmission of a UDP packets 46.

The count decision circuit 224 feeds frequency control signals 228, each of which is meant for particular subject data, to the address output circuit 226 until the counts of the counters decrement to zero. If desired, the counters each may be loaded with the serial number of the associated subject data and increment up to the preselected number of times of retransmission.

The address output circuit 226 receives a signal 230 representative of the serial number of the subject data $N_F$ or $N_{ta}$ from the frequency-of-transmission calculator 220. In response, the address output circuit 226 outputs the address 232 of the buffer 20 corresponding to the serial number $N_F$ or $N_{ta}$ under the control of the frequency control signal 228. Subsequently, the circuit 226 sequentially outputs addresses 232 corresponding to the serial numbers following the serial number $N_F$ or $N_{ta}$ input first. The IFP packets with the serial numbers $N_F$ and $N_{F-1}$, respectively, must be sent N−1 more times and N−2 more times, respectively. This is also true with the following packets. The IFP packet with the serial number $N_{ta}$ must be sent one more time. Such IFP packets are therefore sent in the form of respective UDPTL packets or a single UDPTL packet.

More specifically, in the illustrative embodiment, the serial numbers 05 and 06 are read out of the buffer 20 and fed to the frequency-of-transmission controller 22. At the same time, the IFP packets to which the serial numbers 05 and 06 are attached are read out of the buffer 20 and fed to the UDPTL controller 18. By the above procedure, the IFP packets whose frequencies of transmission are short are sent in the form of a UDPTL packet or UDPTL packets. This allows all the IFP packets to be sent the same number of times as each other.

If desired, the address output circuit 226 may be included in the system controller in order to simplify the device configuration.

A simpler procedure that also equalizes the IFP packets as to the frequency of transmission will be described hereinafter. The frequency-of-transmission monitor 22 sends the UDPTL packet input at the same time as the detection signal 40, while buffering the UDPTL packet. At this stage, the end of the UDPTL packet, of course, corresponds to the secondary field 2, so that the frequency of retransmission has already been satisfied. The monitor 22 therefore sends the IFP packets of the temporarily stored UDPTL packet other than the last IFP packet in the form of a single UDPTL packet.

More specifically, the monitor 22 buffers and stores the IFP packets of the UDPTL packet sent after the receipt of the detection signal 40. The last IFP packet of the UDPTL packet has already been sent the preselected number of times. The last IFP packet is therefore omitted while the other IFP packets are sent in the form of a UDPTL packet. It follows that the monitor 22 repeats transmission until all the IFP packets have been sent. This is also successful to send all the IFP packets the same number of times.

Referring again to FIG. 1, the LAN controller 24 adds a UDP header to the UDPTL packet or UDP payload 46 to thereby complete a UDP packet. Assume that data are interchanged by use of an IFP/UDPTL/UDP/IP layer model by way of example. Then, a UDP packet corresponds to an IP payload. In this case, the LAN controller 24 adds an IP header to an IP payload to thereby generate an IP packet. The LAN controller 24 transforms the IP packet 46 to an analog signal and sends the analog signal to the IP network 100. The LAN controller 24 additionally has an interface function for matching the level of an electric signal to a protocol assigned to the IP network.

In the sending G3 FAX or terminal unit 30, a scanner, not shown, transforms data read out of a document to a corresponding electric signal and sends the electric signal in accordance with the G3 standard, which is proposed by Recommendation T.30. Specifically, the operator of the G3 FAX 30 lays documents, which are paper sheets or similar recording media, on a tray, not shown, which is mounted on the G3 FAX 30. The operator then inputs a read command on an operation panel, not shown, also mounted on the G3

FAX 30. In response, the scanner starts scanning the documents with light. The scanner senses the intensity of reflection from part of each document where data is present and the intensity of reflection from the other part of the same and transforms each of them to a corresponding electric signal. An analog-to-digital converter, not shown, digitizes the electric signal and outputs the resulting digital signal or data 32 having tonality. The data 32 are sent to the FAX controller 12 via a PSTN 32.

Figure 3:
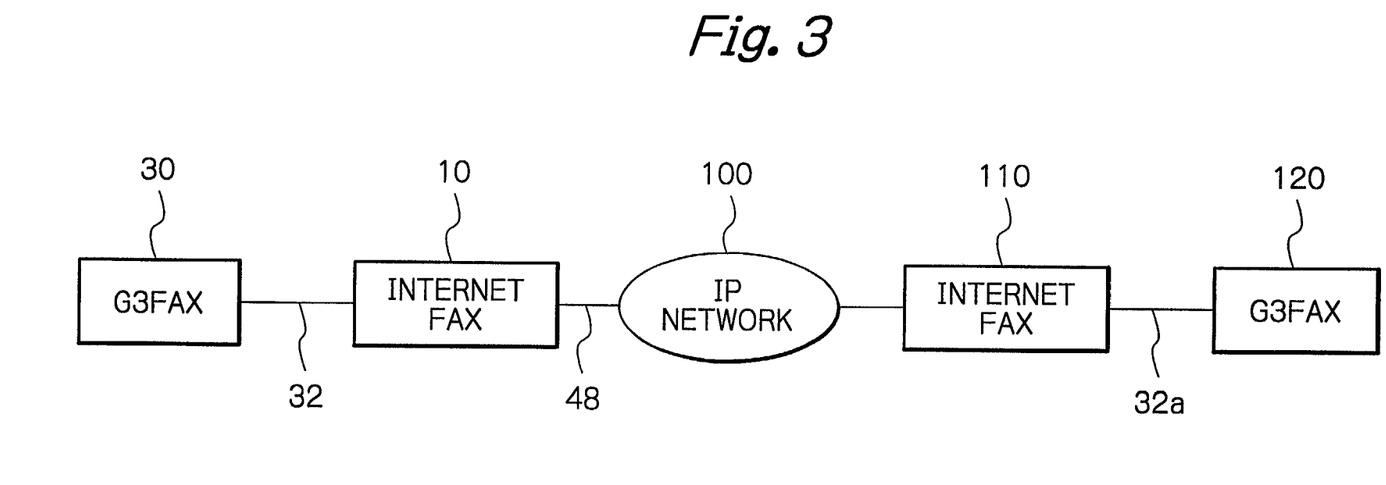
FIG. 3 is a schematic block diagram showing gateways connected to each other via an IP network and each being implemented by the Internet facsimile apparatus shown in FIG. 1.

As shown in FIG. 3, the real-time Internet FAX 10 is connected to another real-time Internet FAX 110 via an IP network 100. The Internet FAX 110 is connected to a G3 FAX 120 via a PSTN 32a. It will be seen that the Internet FAX 10, IP network 100 and Internet FAX 110 constitute a communication domain conforming to the Recommendation T. 38 protocol. The PSTN 32a between the Internet FAX 110 and the G3 FAX 120 conforms to the Recommendation T.30 protocol. The system shown in FIG. 3 terminals at the G3 FAXs 30 and 120.

A real-time facsimile communication sequence generally executed by the system of FIG. 3 will be described hereinafter. The UDPTL controller 18, FIG. 1, writes every IFP packet in the primary field as new data while writing the past data sent in the secondary field in accordance with Recommendation T.38, thereby generating a UDPTL packet.

Figure 4A:
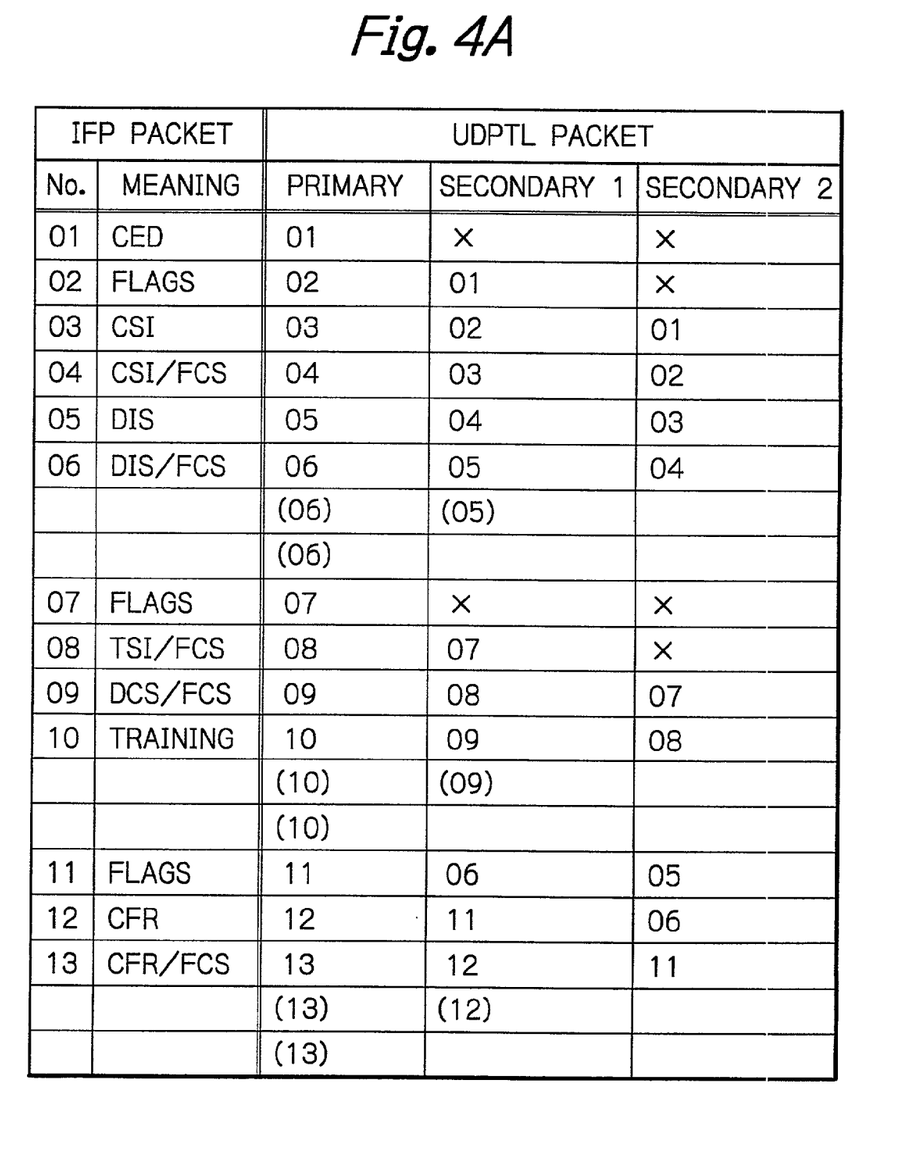
FIGS. 4A and 4B show tables useful for understanding a relation between IFP packets and the primary and secondary fields of UDPTL packets.
Figure 4B:
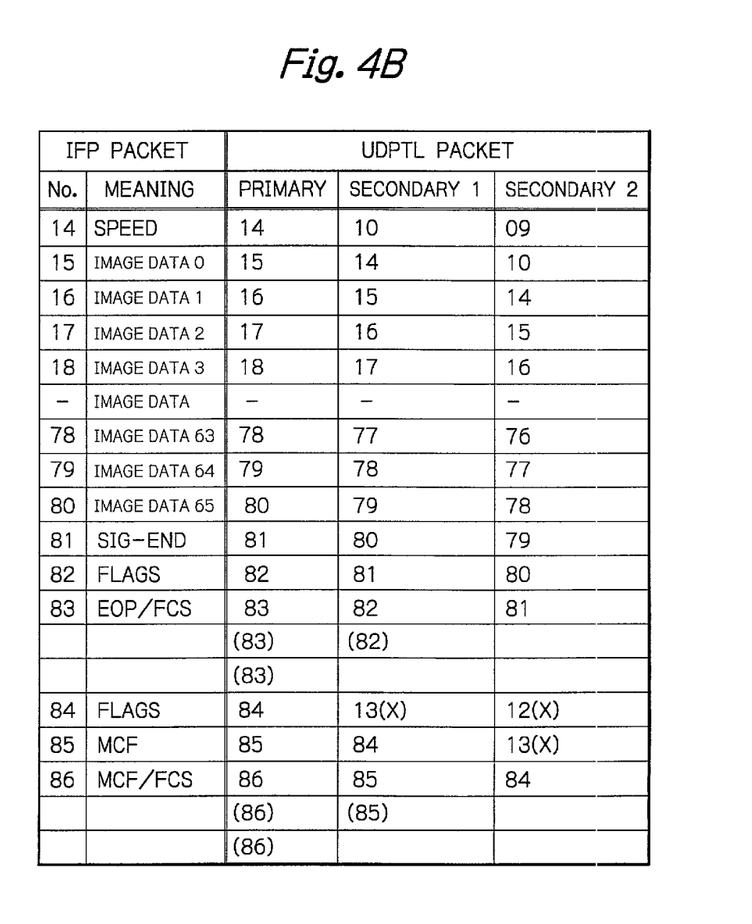

Specifically, a UDP payload generated by the UDPTL controller 18 includes a UDPTL header and a UDPTL payload, as stated earlier. FIGS. 4A and 4B show the data structure of a UDPTL payload. As shown, the UDPTL payload includes a primary and a secondary field, i.e., a plurality of IFP packets. In the illustrative embodiment, the secondary field is made up of a first and a second secondary field 1 and 2. The packetizer/depacketizer 14, FIG. 1, feeds the IFP packets to the buffer 20, FIG. 1, under the control of the system controller, as stated previously. The IFP packets are written to the primary field. The UDPTL controller 18 sequentially shifts the IFP packets read out of the buffer 20 from the secondary field 1 to the secondary field 2 in accordance with the number of times of transmission. Two or more IFP packets may be written to the secondary fields, if necessary.

In FIGS. 4A and 4B, parenthesized numerals shown in the primary and secondary fields are representatives of coded data that are retransmitted by the frequency-of-transmission monitor 22. It will be seen that coded data are retransmitted two times after the transmission of each of IFP packet Nos. 06, 10, 13, 83 and 86. Crosses shown in FIGS. 4A and 4B are representative of non-transmission.

Three IFP packets are stored in a UDPTL packet at positions shown in FIGS. 4A and 4B. In FIGS. 4A and 4B, numbers (Nos.) attached to the IFP packets are not sequence numbers originally given during transmission or receipt, but are serial numbers for easy, convenient identification of the packets. The serial numbers each identify a particular stored packet. FIG. 4 shows a specific case wherein eighty-six IFP packets are dealt with.

Figures 5, 5A:
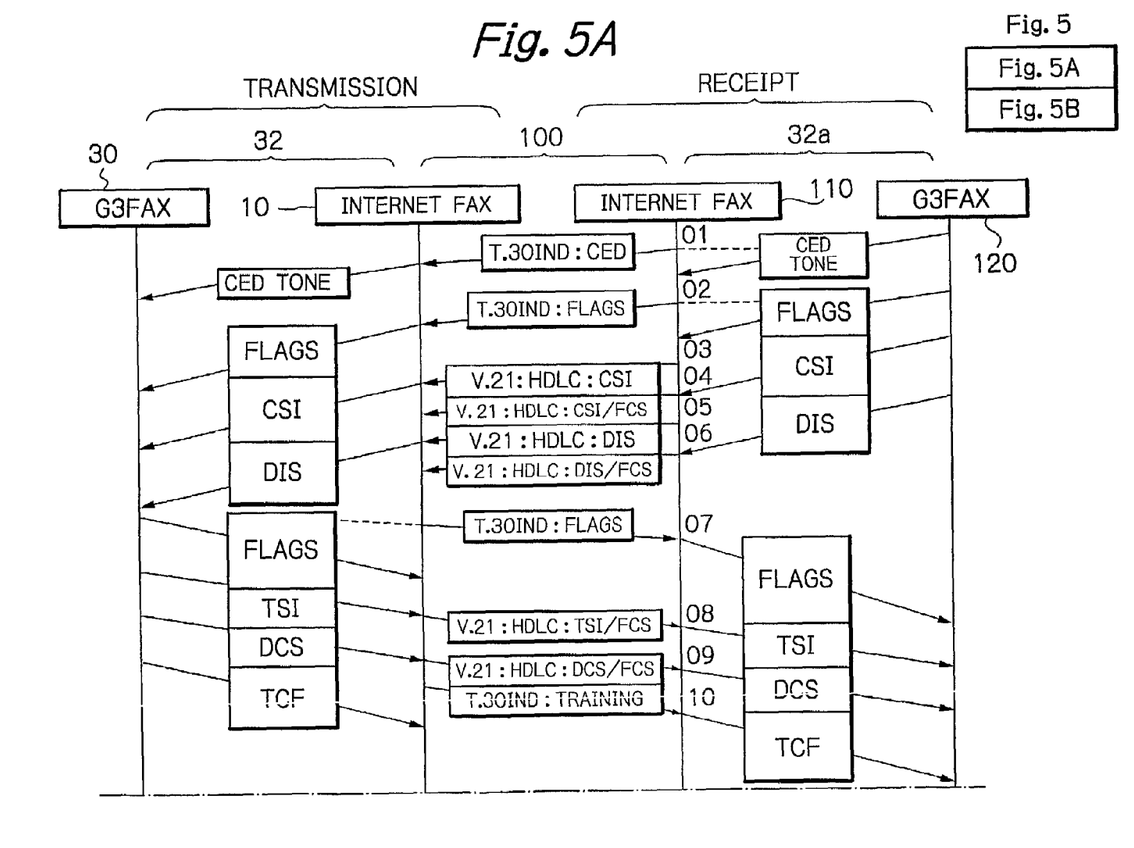
Figure 5B:
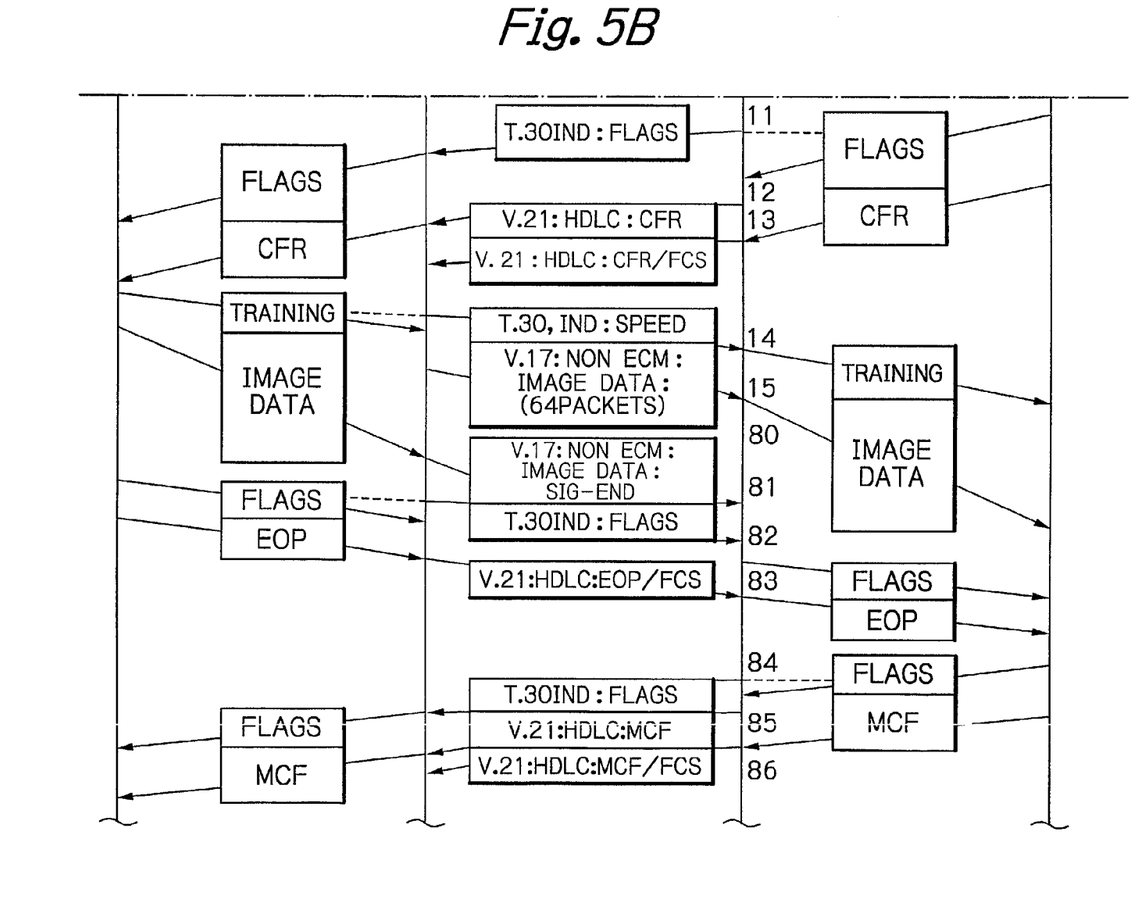

Reference will be made to FIGS. 5A and 5B for describing a conventional real-time communication sequence effected with the eighty-six IFP packets shown in FIGS. 4A and 4B. Numbers 01 through 86 shown in FIGS. 5A and 5B are the serial numbers attached to the IFP packets, but have nothing to do with sequence numbers in the UDPTL packet. Also, in FIGS. 5A and 5B, packets shown on the IP network 100 between the Internet FAX's 10 and 110 are representative of the primary fields of the UDPTL packets.

First, as shown in FIG. 5A, the receiving G3 FAX 120 sends four consecutive commands CED (CallEd station iDentification) tone, Flags, CSI (Called Station Identification) and DIS (Digital Identification Signal) to the Internet FAX 110. In response, IFP packets respectively corresponding to the received commands are input to the UDPTL controller of the Internet FAX 110. The UDPTL controller generates, based on Recommendation T.38, UDPTL packets each storing particular initial data (numbers 02 through 06; control data according to Recommendation T.30). The serial numbers 02 through 06 are representative of a continuous sequence of data sent from the receiving G3 FAX 120 sent at a time. The parenthesized shortage is made up for by a procedure to be described later.

The Internet FAX 110 packetizes the received UDPTL packets and sends the resulting IP packets to the Internet FAX 10 over the IP network 100. The Internet FAX 10 separates the UDPTL packets and IFP packets from the UDP payloads of the IP packets and decodes the separated packets, thereby reconstructing the four commands. The Internet FAX 10 then sends the four commands to the G3 FAX 30.

The transmitting G3 FAX 30 packetizes four commands Flags, TSI (Transmitting Station Identification), DCS (Digital Command Signal) and TCF (Training Check) corresponding to the received four commands. The G3 FAX 30 then sends the resulting UDPTL packets (IFP packets numbers 07 through 10) to the G3 FAX 120 via the Internet FAXs 10 and 110. The numbers 07 through 10 are also representative of a continuous sequence of data sent from the transmitter side.

Subsequently, as shown in FIG. 5B, the receiving G3 FAX 120 sends two commands Flags and CFR (ConFirmation to Receive) to the Internet FAX 110. The Internet FAX 110 packetizes the received commands into three packets (11 through 13) and sends them to the sending G3 FAX 30 via the Internet FAX 10 as reconstructed commands. The data described so far are dealt with as a single continuous sequence of data sent from the receiver side.

On receiving the reconstructed commands, the sending G3 FAX 30 sends a training command (Training), determining that communication has been set up (number 14). The training command controls a modem, not shown, included in the receiving G3 FAX 120. Thereafter, the sending G3 FAX 30 sequentially sends stored image data and commands Flags and EOP (End Of Procedure) to the Internet FAX 10. In response, the Internet FAX 10 sends to the Internet FAX 110 IFP packets numbers 15 through 81 as image data and IFP packet numbers 82 and 83 as commands Flags and EOP/FCS (End Of Procedure/Frame Check Sequence) as a single continuous sequence of data. The Internet FAX 110 sends the received image data and reconstructed two commands Flags and EOP to the G3 FAX 120.

Finally, the receiving G3 FAX 120 sends commands Flags and MCF (Message ConFirmation) to the G3 FAX 30 via the Internet FAXs 110 and 10. This is the end of image data transfer.

As the sequence shown in FIGS. 5A and 5B indicates, the second data from the last and the last data, which are included in each of a sequence of control data and a sequence of image data and designated by serial numbers, are not sent a preselected number of times. This obstructs reliable packet transmission.

Figure 6:
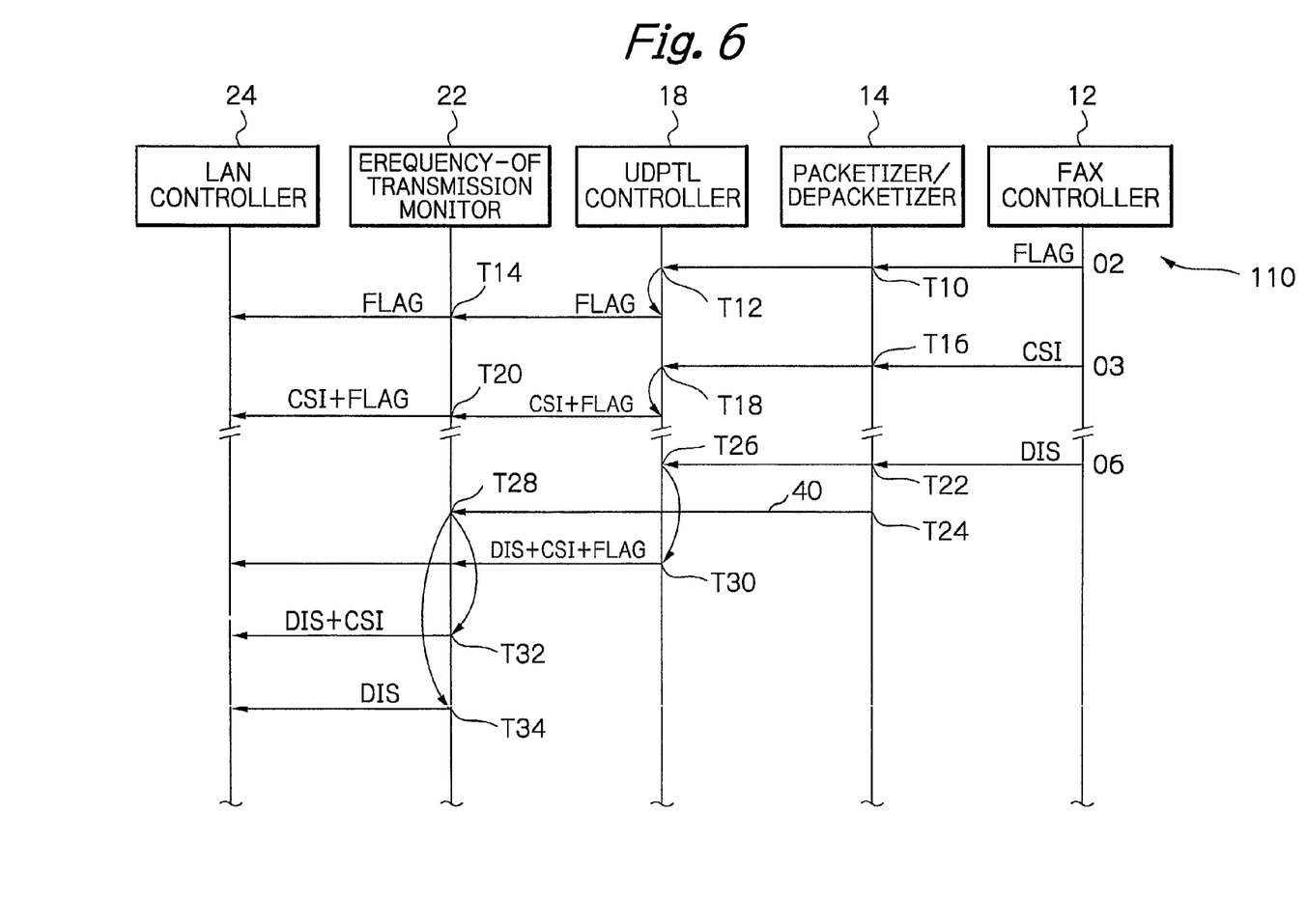
FIG. 6 shows an Internet facsimile communication sequence unique to the illustrative embodiment.

In light of the above, the illustrative embodiment sends all the IFP packets the same number of times in order to enhance reliable packet transmission, as will be described hereinafter with reference to FIG. 6. FIG. 6 demonstrates the transmission from the receiving Internet FAX 110 in order to clearly show the difference between the sequence of the illustrative embodiment and the conventional real-time communication sequence. Because the structural elements of the Internet FAX 110 are identical with the structural elements of the Internet FAX 10, the former is designated by the same reference numerals as the latter.

First, the FAX controller 12 feeds a command Flag to the packetizer/depacketizer 14 (T10). The packetizer/depacketizer 14 packetizes the command Flag and then delivers it to the UDPTL controller 14 (T12). At the same time, the packetizer/depacketizer 14 determines whether or not the current data is the last data of a continuous sequence of data to be sent at a time. If the answer of this decision is positive, the packetizer/depacketizer 14 delivers the detection signal 40 to the frequency-of-transmission monitor 22.

At the above stage of processing, the packetizer/depacketizer 14 does not output the detection signal 40 because the current data is not the last data. The command Flag in the form of an IFP packet is delivered to the UDPTL controller 18. At the same time, the command Flag is delivered to the buffer 20 via the signal line 42 and stored therein together with the serial number 02. The serial number is used only for an illustration purpose and should originally be the sequence number of a UDPTL packet. The UDPTL controller 18 feeds the generated UDPTL packet 44 to the frequency-of-transmission monitor 22 (T14). In this case, the UDPTL controller 18 does not send any data because the packet 44 stores no data in its secondary field.

The frequency-of-transmission monitor 22 simply transfers the UDPTL packet 44 to the LAN controller 24 as a packet 46. The LAN controller 24 executes interface conversion with the packet 46 and then sends it to the IP network 100.

Further, the FAX controller 12 feeds a CSI signal to the packetizer/depacketizer 14 (T16). The packetizer/depacketizer 14 again determines whether or not the CSI signal is the last data. Because the CSI signal is not the last data, the packetizer/depacketizer 14 packetizes the CSI signal and delivers the resulting CSI IFP packet to the UDPTL controller 18 (T18). Also, the CSI IFP packet is fed to and stored in the buffer 20 together with the serial number 03. Again, the serial number is used only for an illustration purpose and should originally be the sequence number of a UDPTL packet. The UDPTL controller 18 packs the CSI signal and the command Flag read out of the buffer 20 in the primary field and secondary field 1 of a UDPTL packet, respectively. The UDPTL packet (CSI+Flag) 44 is fed from the UDPTL controller 18 to the frequency-of-transmission monitor 22 (T20).

The frequency-of-transmission monitor 22 transfers the UDPTL packet (CSI+Flag) to the LAN controller 24 as a packet 46. The LAN controller 24 sends the packet 48 to the IP network 100 after interface conversion.

Subsequently, the FAX controller 12 feeds a DIS signal to the packetizer/depacketizer 14 (T22). At the same time, the FAX controller 12 detects the disappearance of a carrier from the G3 FAX 120 and reports to the packetizer/depacketizer 14 the fact that the DIS data is the last data. On receiving the DIS data, which is one of the last data, (T24), the packetizer/depacketizer 14 generates an IFP packet storing the DIS data and feeds the resulting DIS IFP packet to the UDPTL controller 18 (T26). Also, the decision circuit of the packetizer/depacketizer 14 determines that the DIS data is the last data, and feeds the detection signal 40 to the frequency-of-transmission monitor 22 (T28).

The UDPTL controller 18 packs the DIS IFP packet in the primary field of a UDPTL packet. Further, the UDPTL controller 18 packs the CSI IFP packet and flag IFP packet read out of the buffer 20 in the secondary fields 1 and 2 of the same UDPTL packet, respectively. The resulting UDPTL packet (DIS+CSI+Flag) is fed from the UDPTL controller 18 to the frequency-of-transmission monitor 22. (T30). Substantially at the same time, the DIS IFP packet is stored in the buffer 20 together with the serial number 06. Again, the serial number is used only for an illustration purpose and should originally be the sequence number of a UDPTL packet. The frequency-of-transmission monitor 22 sends the UDPTL packet (DES+CSI+Flag) via the LAN controller 24 as a UDPTL packet 46.

At this stage of processing, the frequency calculator 220 of the frequency-of-transmission monitor 22 has counted the IFP packet 05 two times and the IFP packet 06 one time. Because the preselected frequency of transmission is three times, the IFP packets 05 and 06 can be sent one more time and two more times, respectively. The count decision circuit 224 feeds a frequency control signal 228 representative of such a number of times of transmission to go to the address output circuit 226. The address output circuit 226, supplied with data representative of the serial number to be output, delivers the address of the buffer 20 corresponding to the data 232 to the buffer 20.

The IFP packet data 42 designated by the address input to the buffer 20 is read out of the buffer 20 and fed to the frequency-of-transmission monitor 22. As a result, the monitor 22 packs the serial numbers 06 and 05 in, e.g., the primary field and secondary field 1 of a UDPTL packet, respectively (T32). Because the serial number 06 has not been transmitted the preselected number of times yet, the address output circuit 226 again delivers the address 232 of the serial number 06 to the buffer 20. In response, the IFP packet data 42 is read out of the address of the buffer 20 corresponding to the serial number 06 and fed to the frequency-of-transmission monitor 22. The monitor 22 therefore again outputs the DIS IFP packet.

If desired, an arrangement may be made such that the frequency-of-transmission monitor 22 controls the reading of IFP packets out of the buffer 20 while the buffer 20 feeds the IFP packets to the UDPTL controller 18. The monitor 22 has been shown and described as repeatedly sending the subject data up to the preselected number of times by counting it up. Alternatively, the monitor 22 may be constructed to reduce a difference between the preselected count and the current count to zero. Further, the monitor 22 may be implemented by software in order to easily set up correspondence between the subject data to be sent and the number of times of transmission.

As stated above, in the event of transmission of data, including the redundant secondary field based on Recommendation T.38, in a real-time communication sequence, the illustrative embodiment takes account of the frequency of transmission of the individual IFP packet. This successfully obviates irregularity in the number of times of transmission and thereby allows all the IFP packets to be sent with even reliability. Consequently, the illustrative embodiment transmit, data with higher reliability than conventional UDP data.

More specifically, during a sequence of real-time communication, the illustrative embodiment determines whether or not the current data is the last data of a sequence of continuous data. If the answer of the decision is positive, data not transmitted a preselected number of times is repeatedly sent in accordance with a control signal output from the frequency-of-transmission monitor 22. In this manner, all the coded data are repeatedly sent the preselected number of times and therefore with the same reliability. The illustrative embodiment can send even UDP data more reliability than conventional UDP communication.

If desired, the Internet FAXs 10 and 110 each may be provided with the function of a G3 facsimile apparatus. Of course, the present invention is not limited to an Internet facsimile apparatus for real-time facsimile communication, but can send all the data for UDP/IP communication a preselected number of times and therefore with the same reliability even with software.

In summary, it will be seen that the present invention provides a communication connecting device and a data output control method capable of sending a continuous sequence of data with constant reliability and thereby contributing a great deal to reliable, connectionless UDP communication.

The entire disclosure of Japanese patent application No. 2000-262744 filed on Aug. 31, 2000, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A communication connecting device connected at one end to a first terminal unit and connected at the other end to a second terminal unit via an IP network, and selectively operable with a plurality of communication standards adaptive to said first terminal unit, said second terminal unit and said IP network for thereby implementing real-time communication, said device comprising:
 a terminal unit control circuit for storing data received from the first terminal unit or the second terminal unit, and controlling said first terminal unit in accordance with a first communication standard;
 a first storage for storing size information representative of a size of data to be coded;
 a coding/decoding circuit for collectively coding the data in accordance with the size information read out of said first storage and the first communication standard and determining whether or not said data is the last data of a sequence of continuous coded data or decoding coded data received from the second terminal unit in accordance with said first communication standard;
 a second storage for storing, assuming a loss of the coded data output from said coding/decoding circuit, said coded data;
 an information adding/separating circuit for adding a header and data, which makes up for the loss of the coded data assumed, to said coded data in accordance with a second communication standard relating to the IP network or separating coded data from data received from the second terminal unit and feeding said coded data separated to said coding/decoding circuit;
 a frequency-of-transmission monitoring circuit for determining, in response to a detection signal output from said coding/decoding circuit to show that the coded data to be newly fed is the last coded data, subject coded data transmitted an actual number of times, which is a sum of a transmission of said newly input coded data and a number of times of past transmission effected on the assumption of the loss, different from a preselected reference number of times of transmission, generating a control signal for causing said subject coded data to be repeatedly transmitted by a difference between said actual number of times and said reference number of times, and causing said subject coded data to be read out of said second storage in accordance with said control signal; and
 an interfacing circuit for converting the coded data input via said frequency-of-transmission monitoring circuit to a signal based on a command or converting a signal received from the second terminal unit to the coded data,
 wherein said frequency-of-transmission monitoring circuit comprises:
  a difference calculating circuit for determining, among the newly fed coded data designated by serial numbers, the coded data with a last serial number and the data with an oldest serial number having been sent in a continuous sequence up to said data with said last serial number to be the subject coded data, and calculating a difference between the actual number of times of transmission of individual subject data and the reference number of times; and
  a control signal generating circuit for generating said control signal for causing the individual subject coded data to be repeatedly sent until said difference decreases to zero or until the actual number of times reaches the reference number of times.

2. The device in accordance with claim 1, wherein said coding/decoding circuit comprises a decision circuit for determining whether or not the coded data is the last coded data of a continuous sequence of coded data.

3. The device in accordance with claim 1, wherein the first communication standard and the second communication standard respectively correspond to ITU-T Recommendation T.30 (revised in 1996) and Recommendation T.38 (June/1998), and wherein said first terminal unit and said second terminal unit comprise G3 (Group 3) facsimile apparatuses corresponding to Recommendation T.30 (revised in 1996).

4. A data output control method for a communication connecting device connected at one end to a first terminal unit and connected at the other end to a second terminal unit via an IP network, and selectively operable with a plurality of communication standards adaptive to said first terminal unit, said second terminal unit and said IP network for thereby implementing real-time communication, said data output control method comprising:
 a first step of storing data received from the first terminal unit or the second terminal unit;
 a second step of outputting size information representative of a size of data to be coded;
 a third step of collectively coding the data in accordance with the read out size information and a first communication standard, and determining whether or not the coded data is a last one of a sequence of continuous coded data;
 a fourth step of storing the coded data on the assumption of a loss of said coded data;
 a fifth step of reading out, in accordance with a second communication standard relating to the IP network, a header for the coded data and the coded data stored on the assumption of the loss of said coded data, and combining said header and said coded data;
 a sixth step of determining, in response to a detection signal showing that the coded data to be newly fed is the last coded data, subject coded data transmitted an actual number of times, which is a sum of a transmission of said newly input coded data and a number of times of past transmission effected on the assumption of the loss, different from a preselected reference number of times of transmission, generating a control signal for causing said subject coded data to be repeatedly transmitted by a difference between said actual number of times and said reference number of times, and causing said subject coded data to be read out in accordance with said control signal; and a seventh step of converting the coded data to a signal based on a command and outputting said signal, wherein said sixth step comprises:

an eighth step of determining, among the newly fed coded data designated by serial numbers, the coded data with a last serial number and the coded data with an oldest serial number having been sent in a continuous sequence up to said data with said last serial number to be the subject coded data, and calculating a difference between the actual number of times of transmission of individual subject coded data and the reference number of times; and a ninth step of generating said control signal for causing the individual subject data to be repeatedly sent until said difference decreases to zero or until the actual number of times reaches the reference number of times.

5. The method in accordance with claim 4, wherein the first communication standard and the second communication standard respectively correspond to ITU-T Recommendation T.30 (revised in 1996) and Recommendation T.38 (June/1998), and wherein said first terminal unit and said second terminal unit comprise G3 facsimile apparatuses corresponding to Recommendation T.30 (revised in 1996).

* * * * *

UNITED STATES PATENT AND TRADEMARK OFFICE
CERTIFICATE OF CORRECTION

| | | |
|---|---|---|
| PATENT NO. | : 7,023,805 B2 | Page 1 of 1 |
| APPLICATION NO. | : 09/939730 | |
| DATED | : April 4, 2006 | |
| INVENTOR(S) | : Tajiri et al. | |

It is certified that error appears in the above-identified patent and that said Letters Patent is hereby corrected as shown below:

On the title page,

[*] Notice: Subject to any disclaimer, the term of this patent is extended or adjusted under 35 USC 154(b) by (851) days Delete the phrase "by 851" and insert -- by 894 days--

Signed and Sealed this

Twenty-ninth Day of May, 2007

JON W. DUDAS
*Director of the United States Patent and Trademark Office*